United States Patent
Uehigashi (10) Patent No.: US 7,068,577 B2
(45) Date of Patent: Jun. 27, 2006

(54) DISK DRIVE AND METHOD FOR REDUCING SPIN-UP PROCESSING TIME

(75) Inventor: Naoya Uehigashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 417 days.

(21) Appl. No.: 10/352,998

(22) Filed: Jan. 29, 2003

(65) Prior Publication Data

US 2003/0156517 A1   Aug. 21, 2003

(30) Foreign Application Priority Data

Feb. 20, 2002   (JP) .................. P 2002-043462

(51) Int. Cl.
*G11B 7/00* (2006.01)

(52) U.S. Cl. .............. 369/53.22; 369/53.37; 369/47.55; 369/47.54

(58) Field of Classification Search ............ 369/53.22, 369/53.37, 47.55, 47.54
See application file for complete search history.

(56) References Cited

U.S. PATENT DOCUMENTS

| | | | |
|---|---|---|---|
| 6,388,960 B1 * | 5/2002 | Furukawa et al. | 369/30.24 |
| 6,728,181 B1 * | 4/2004 | Shimoda et al. | 369/53.2 |
| 6,853,609 B1 * | 2/2005 | Kusumoto et al. | 369/44.29 |
| 6,882,609 B1 * | 4/2005 | Williams et al. | 369/47.48 |
| 2002/0150010 A1 * | 10/2002 | Takahashi | 369/47.14 |
| 2004/0120237 A1 * | 6/2004 | Lee | 369/53.37 |
| 2005/0141375 A1 * | 6/2005 | Ehrlich et al. | 369/47.38 |

FOREIGN PATENT DOCUMENTS

| | | |
|---|---|---|
| JP | 10-40666 | 2/1998 |
| JP | 10-199154 | 7/1998 |
| JP | 2000-149447 | 5/2000 |

* cited by examiner

*Primary Examiner*—William Klimowicz
*Assistant Examiner*—Nathan Danielsen
(74) *Attorney, Agent, or Firm*—Morgan Lewis & Bockius (57) ABSTRACT

In a spin-up process in a disk drive, the values of a PMA counter and a TOC counter are compared with each other with respect to a write-once disk. The PM counter is a adapted to count the number of disks in which information is written in a PMA region, among the disks from which information is theretofore read in the disk drive. The TOC counter is adapted to count the number of disks in which information is not written in the PMA region.

4 Claims, 6 Drawing Sheets

INNER SIDE						OUTER SIDE

DISK DRIVE AND METHOD FOR REDUCING SPIN-UP PROCESSING TIME

BACKGROUND OF THE INVENTION

This invention relates to a disk drive, and more particularly to a disk drive capable of carrying out a maintenance process thereof.

Various kinds of techniques concerning operations of a disk drive for writing information in a recording medium and reading information therefrom are heretofore disclosed.

For example, the Unexamined Japanese Patent Application Publication No. Hei 10-199154 discloses the techniques for determining whether each read-out region is in a complete session or in an incomplete session, altering an operation mode in accordance with the results of the determination, and thereby enabling information to be read out even when the information is in an incomplete session.

The Unexamined Japanese Patent Application Publication No. 2000-149447 discloses techniques for executing a simple formatting operation, in which, when a recording medium is formatted in a disk drive, a drive controller records, reproduces, and erases a track consisting of a plural packet for a CD-RW disk, recording data in a user data part on a disk is omitted, and data are recorded in only a track information recording region, a memory program region, and a pre-gap memory.

The Unexamined Japanese Patent Application Publication No. Hei 10-40666 discloses a spin-up method of carrying out continuously in the order of records stored in an optical disk a process for collecting TOC (Table of Contents) information and a process for collecting information on a track recorded by a fixed recording system. In the method disclosed in this publication, a disk drive in use is adapted to determine when a spin-up operation is started whether a recording medium is a write-once type medium or not so as to reduce the time for executing a spin-up operation. When the recording medium is a write-once type medium, such as CD-R/RW, information is read from a program memory region (special region for tentatively recording therein information on a disk in which information is half recorded, which will hereinafter be referred to as PMA region). When the recording medium is other than a write-once type medium (e.g., an audio CD), the reading of the information recorded in the PMA region is not done but the reading of information recorded in a TOC region is done.

When the reading of information recorded in the PMA region of a write-once type medium is done as mentioned above, the information is read from an inner side to an outer side of the disk. Therefore, the information recorded in the disk is read efficiently.

In each of FIG. 7 to FIG. 10, the arrangement of storage regions from an inner circumference of a disk D toward an outer circumference thereof as shown by arrow (1). On a disk D, a PMA region in which PMA information is recorded, a lead-in region in which TOC information is recorded and a data region in which user's data are stored are arranged in order from an inner circumferential side of the disk toward an outer circumferential side thereof.

Figure 7:
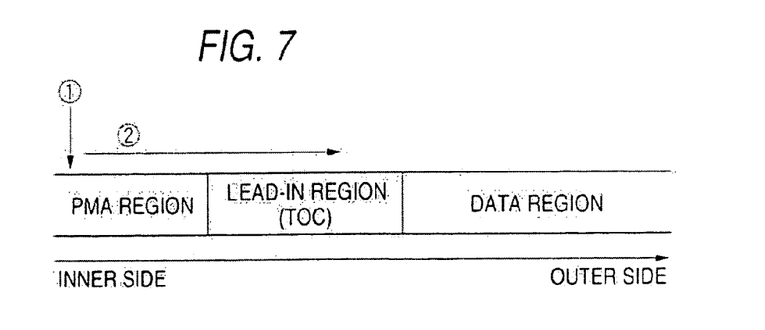
FIG. 7 is a drawing depicting an information reading mode in the disk drive.

In an example of FIG. 7, a pickup is moved as shown by arrow (2) first to the PMA region, and the information stored in the PMA region is then read, the reading of information being thereafter done from the lead-in region and data region in that order.

Figure 8:
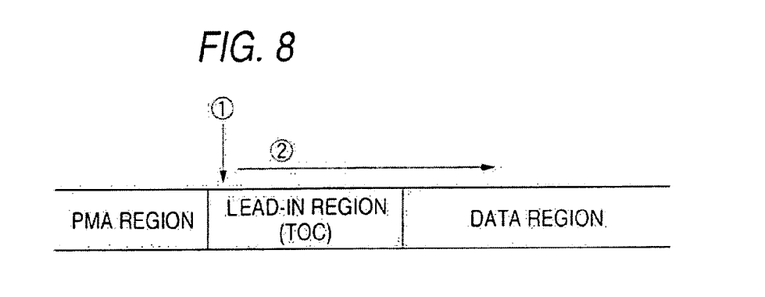
FIG. 8 is a drawing depicting an information reading mode in the disk drive.

In the case of other recording medium, the reading of information is done from the lead-in region thereof as mentioned above. In such a case, information is not written in the PMA region of the disk D. Therefore, as shown by the arrow (1), the reading of information is started from the lead-in region thereof, and continued in the same manner toward an outer circumference of the disk.

However, even in the case of a write-once type medium, information is not recorded in a PMA region thereof when the information is written by a disk-at-once method (method of writing data collectively at once on a disk as a whole).

Therefore, when the reading of information is done in a mode described by using FIGS. 7 and 8, it is conceivable that a situation in which the spin-up processing time is prolonged occurs as will be described below.

Figure 9:
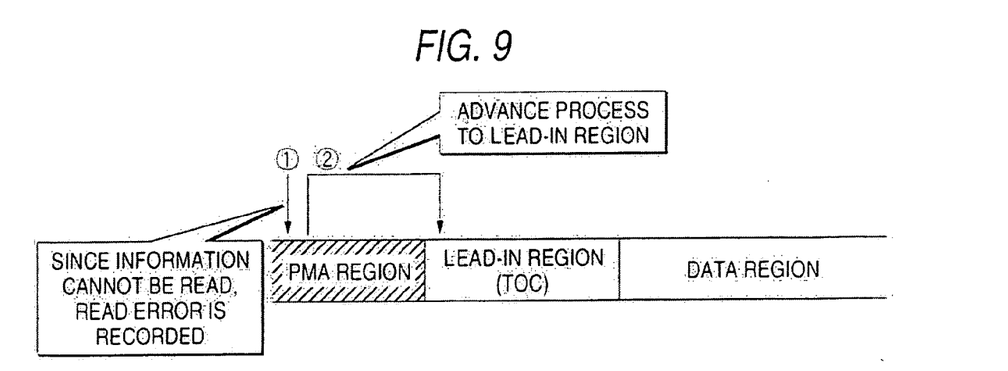
FIG. 9 is a drawing depicting an information reading mode in the disk drive.

In particular, when the reading of information is done from a PMA region by a seeking operation of a pickup with respect to a disk D in which information is written by a disk-at-once method as shown in FIG. 9, a read error occurs in the PMA as shown in FIG. 9, and a seeking operation toward a TOC region is carried out again. In short, the execution of the reading of the information in the first PMA region proves to be useless in this case, so that starting a pickup to read information from the TOC region as shown in FIG. 8 is preferable.

Figure 10:
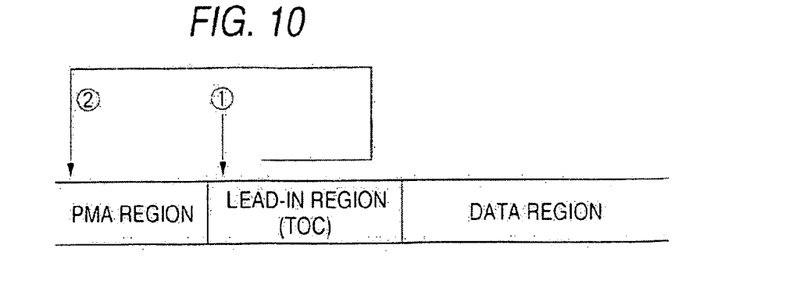
FIG. 10 is a drawing depicting an information reading mode in the disk drive.

However, when the reading of the information from the TOC region is done with respect to all the disks, the following inconveniences occur in a disk D constituting a write-once type medium and having information in a PMA region. When the reading of TOC data is done in a lead-in region first as shown in FIG. 10 with information written in a PMA region, the reading of the information in the same region is then done by carrying out a seeking operation of a pickup as shown by an arrow (2).

When the reading of information is done as described above with a reading mode changed in accordance with the kind of a disk as shown in FIGS. 7 and 8, the pin-up processing time can be reduced unless a disk as a write-once disk in which the writing of information is not done by a disk-at-once method is used. However, when a disk in which the information is written by a disk-at-once method is used as a write once disk, the occurrence of a situation in which the spin-up processing time is prolonged as shown in FIG. 9 and FIG. 10 is possible.

The present invention is conceived in view of these circumstances, and provides a disk drive capable of further reducing the spin-up processing time and a method thereof.

SUMMARY OF THE INVENTION

The present invention provides (1) a disk drive having a tray on which a disk is mounted, a pickup adapted to read information stored in the disk mounted on the tray, a pickup controller adapted to control an information reading mode of the pickup, and a disk type determination element adapted to determine whether the disk mounted on the tray is a write-once type disk or not, wherein the pickup controller further includes a counter adapted to store therein a first number representing the number of disks in which information is written in program memory areas thereof, among write-once type disks which are mounted on the tray, and a second number representing the number of disks in which information is not written in program memory areas thereof, among the same write-once type disks, the pickup controller being adapted to have the pickup start reading information from the program memory areas of the disks during a disk spin-up operation when the first number is larger than the second number, and have the pickup start reading information from lead-in areas of the disks during the mentioned operation when the second number is larger than the first number, the counter having an upper limit to storable first number or second number, the counter being adapted to compute a difference between the first and second number when either one of these two numbers reaches the upper limit of storage thereof, reset the first and second numbers, and store the difference as one of the two numbers.

The present invention provides (2) a disk drive, wherein, when most of the write-once type disks mounted on a tray are disks in which information is written by a disk-at-once method, the reading of the information stored in each disk is done from a lead-in area thereof, or wherein, even when the number of disks in which information is written in a program memory area thereof, or the number of disks in which information is not written in the same area thereof reaches an upper limit of the storage thereof, the condition in which an upper limit level thereof is attained can be cancelled with a difference between these numbers maintained.

The present invention provides (3) a disk drive having a tray on which a disk is mounted, a pickup adapted to read information stored in the disk mounted on the tray, a pickup controller adapted to control an information reading mode of the pickup, and a disk type determination element adapted to determine whether the disk mounted on the tray is a write-once type disk, wherein the pickup controller further includes a counter adapted to store therein a first number representing the number of disks in which information is written in program memory areas thereof, among write-at-once type disks which are mounted on the tray, and a second number representing the number of disks in which information is not written in program memory areas thereof, among the same write-at-once type disks, the pickup controller being adapted to have the pickup start reading information from the program memory areas of the disks during a disk spinning-up operation when the first number is larger than the second number, and have the pickup start reading information from lead-in areas of the disks during the mentioned operation when the second number is larger than the first number.

The present invention provides (4) a disk drive wherein, when most of write-once type disks mounted on a tray are disks in which information is written by a disk-at-once method, the reading of the information stored in the disks is done from lead-in area thereof.

The present invention provides (5) a method for reducing spin-up processing time comprising the steps of:

storing a first number representing the number of disks, in which information is written in program memory areas thereof, among write-once type disks which is mounted on said tray, and a second number representing the number of disks, in which information is not written in program memory areas thereof, among the same write-once type disks, in a counter;

comparing the first number and the second number during a disk spin-up operation, starting a pickup to read information from the program memory areas of the disks when the first number is larger than the second number, and starting a pickup to read information from lead-in areas of the disks when the second number is larger than the first number, determining if either one of the first number and the second number has reached an upper limit of said counter or not, computing a difference between the first and second numbers, resetting the first and second numbers, and storing the difference as one of the two numbers.

The present invention provides (6) a method for reducing spin-up processing time comprising the steps of:

storing a first number representing the number of disks, in which information is written in program memory areas thereof, among write-once type disks which is mounted on said tray, and a second number representing the number of disks, in which information is not written in program memory areas thereof, among the same write-once type disks;

comparing the first number and the second number during a disk spin-up operation, starting a pickup to read information from the program memory areas of the disks when the first number is larger than the second number, and starting a pickup to read information from lead-in areas of the disks when the second number is larger than the first number.

DETAILED DESCRIPTION OF THE PREFERRED EMBODIMENTS

An embodiment of the present invention will now be described with reference to the drawings.

Figure 1:
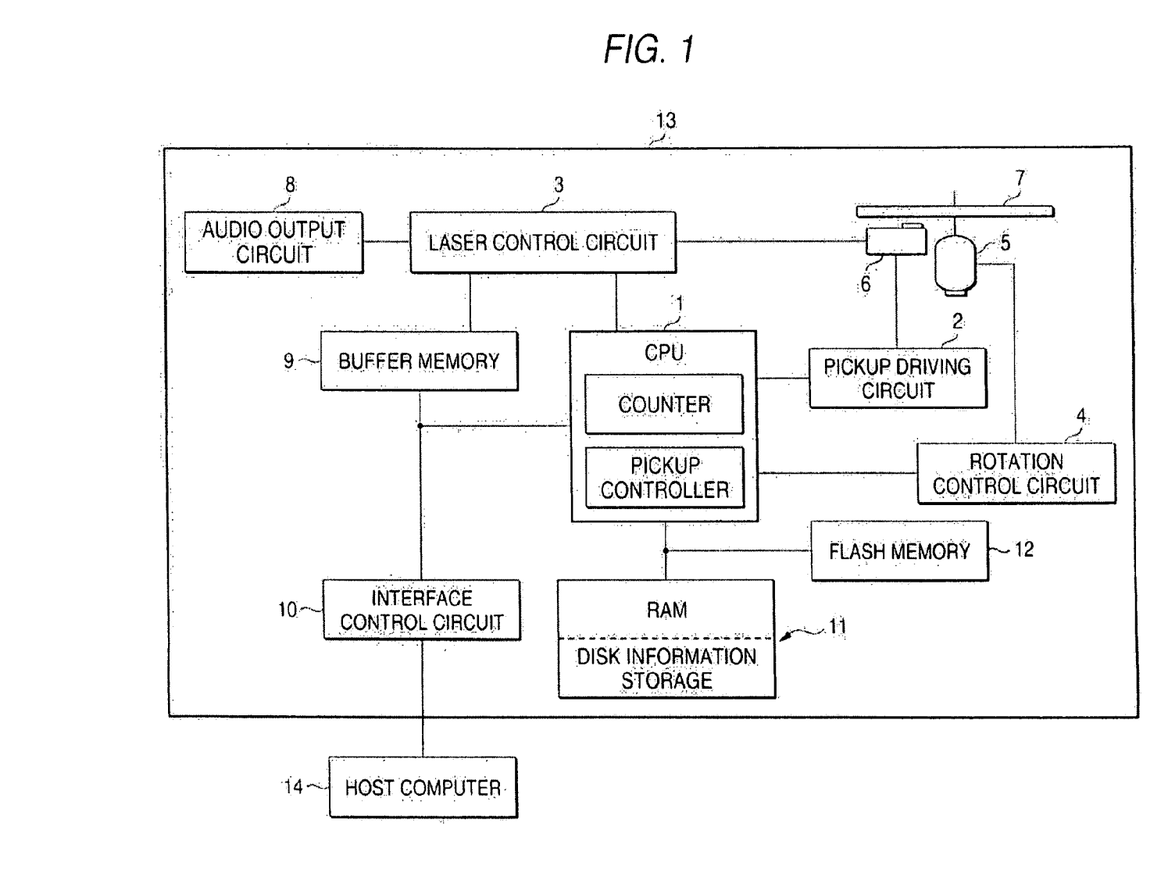
FIG. 1 is a block diagram showing a mode of controlling a disk drive according to an embodiment of the present invention.

FIG. 1 is a block diagram for a controller of disk drive 13. The disk drive 13 is connected to a host computer 14 through a predetermined interface. The disk drive 13 is provided therein with a CPU 1, a pickup driving circuit 2, a laser control circuit 3, a motor 5, a laser pickup 6, an audio output circuit 8, a buffer memory 9, an interface circuit 10, a RAM 11 and a flash memory 12. The disk drive 13 is also provided with a tray (not shown), on which a disk 7 is mounted and set.

When the disk 7 is inserted into the disk drive, the CPU 1 gives instructions to a rotation control circuit 4 and controls the rotation of the motor 5, a spin-up operation being thereby started. The CPU 1 then gives instructions to the pickup driving circuit 2 to drive the pickup 6 and read the data. The data read out from the disk 7 are input into the laser control circuit 3, where the data are stored in the buffer memory 9. The RAM 11 has disk information storage in a part thereof, and the CPU 1 reads out from the buffer memory 9 control information, such as TOC, PMA and a packet address among the disk data input thereinto, the CPI 1 then storing the control information in the disk information storage in the RAM 11. The operation of a laser beam, and the reading of information from the reflected light of the laser are controlled by the laser control circuit 3.

When a play command is issued from the host computer 14 so as to play the disk 7 made of an audio CD, the audio data read from the disk 7 are input into the laser control circuit 3, and the resultant data are input into the audio output circuit 8. These data are converted into voice data and played. The CPU 1 determines from a play command issued from the host computer 14 whether the voice data are to be played or not. A series of these read and play control sequences are stored in the flash memory 12.

Figure 2:
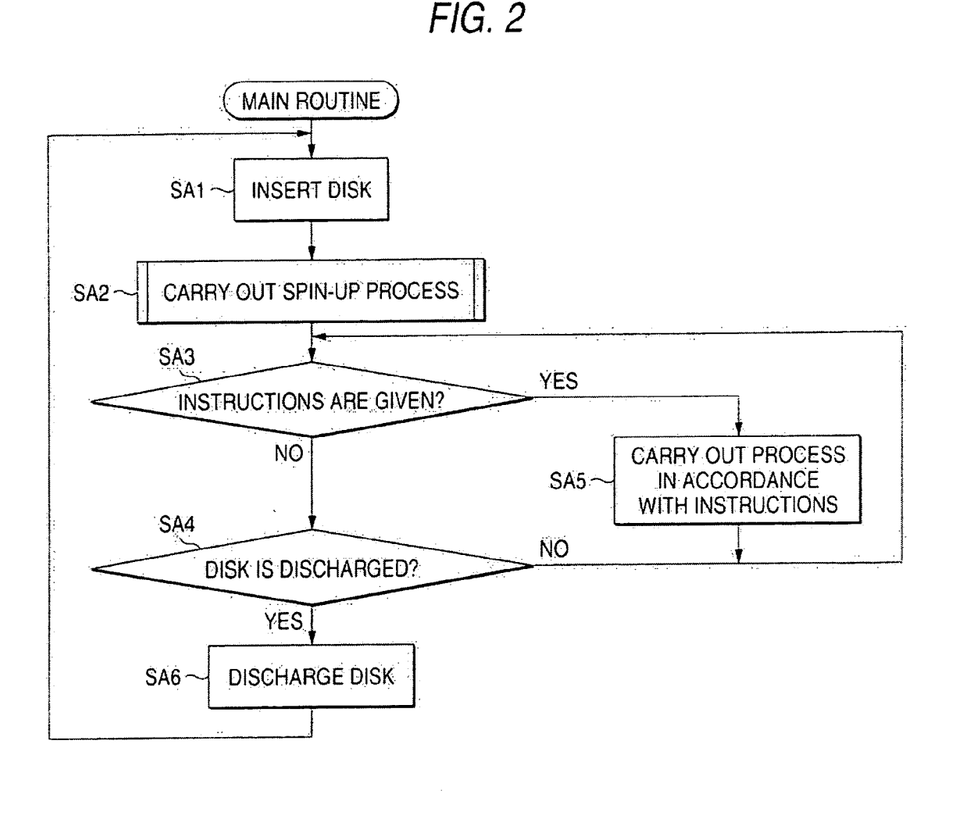
FIG. 2 is a flow chart of a main routine of a CPU shown in FIG. 1.

A process carried out by the CPU 1 will now be described in detail. FIG. 2 is a flow chart of a main routine of the CPI 1.

The CPU 1 first carries out a process, which is to be executed when the disk 7 is inserted into the disk drive 13, in a step SA1. As a result, the disk 7 is put in an information readable state as shown in FIG. 1.

The CPU 1 then carries out in step SA2 a spin-up process. The details of the spin-up process will be described later.

The CPU 1 then determines in step SA3 whether the host computer 14 gives instructions to read information stored on disk 7 to the pickup driving circuit 2. When such instructions are given to the pickup driving circuit 2, a process in accordance with those instructions is carried out in a step SA5, and the operation is returned to the step SA3.

When the CPU 1 determines in step SA3 that the host computer 1 has not given such instructions to the pickup driving circuit 2, the host computer determines in step SA4 whether instructions to discharge the disk 7 are given or not. The instructions to discharge the disk 7 are given through the host computer 14 in some cases, and by having a user operate a predetermined button and the like, which is provided on the disk drive 13 itself, in some cases. When instructions to discharge the disk 7 are given, the disk 7 is discharged in step SA6, and the operation is returned to step SA1 to wait for the insertion of a subsequent disk. When the disk-discharging instructions are not given, the operation is returned to step SA3.

Figure 3:
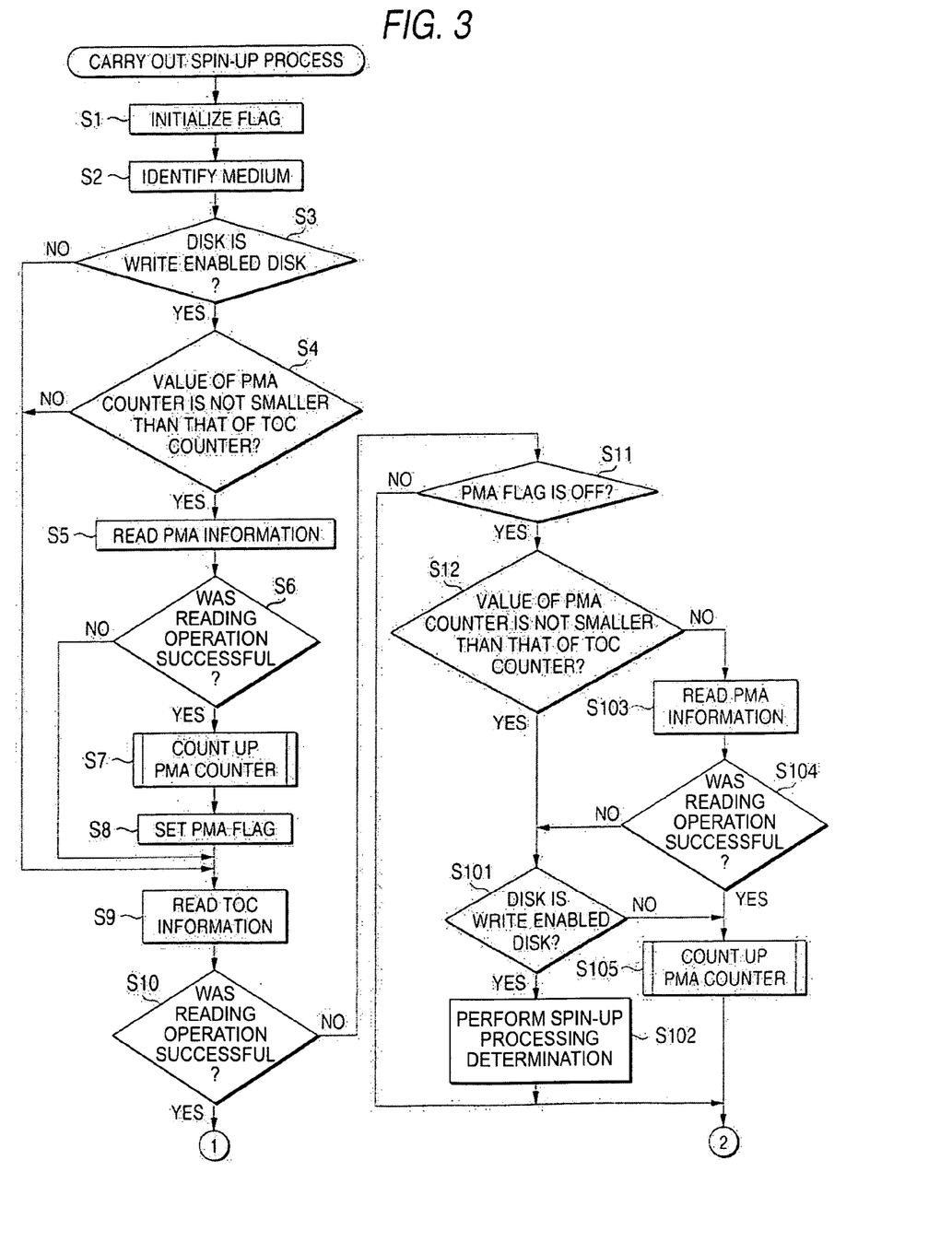
FIG. 3 is a flow chart of a subroutine of a spin-up process of FIG. 2.
Figure 4:
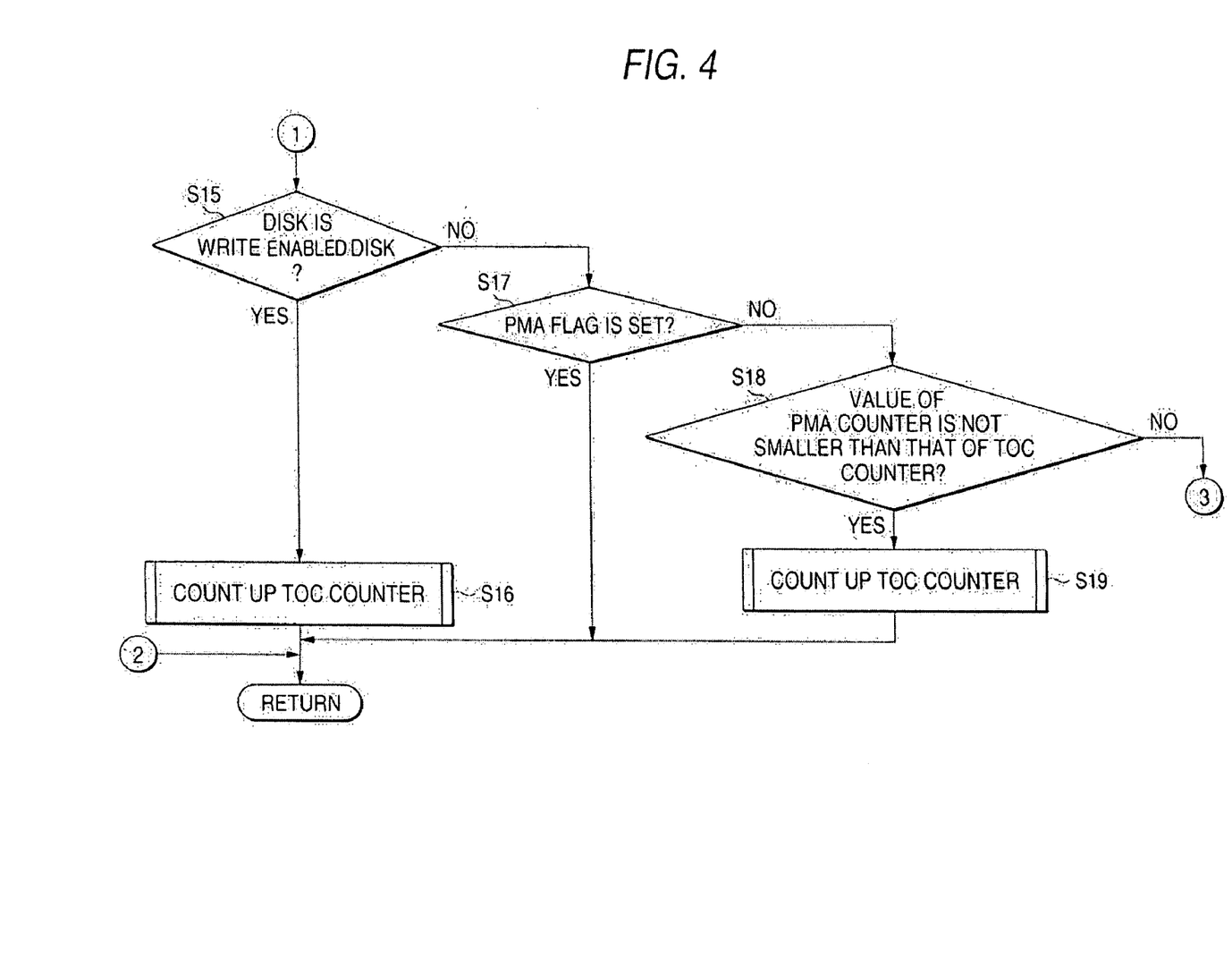
FIG. 4 is a flow chart of a subroutine of a spin-up process of FIG. 2.
Figure 5:
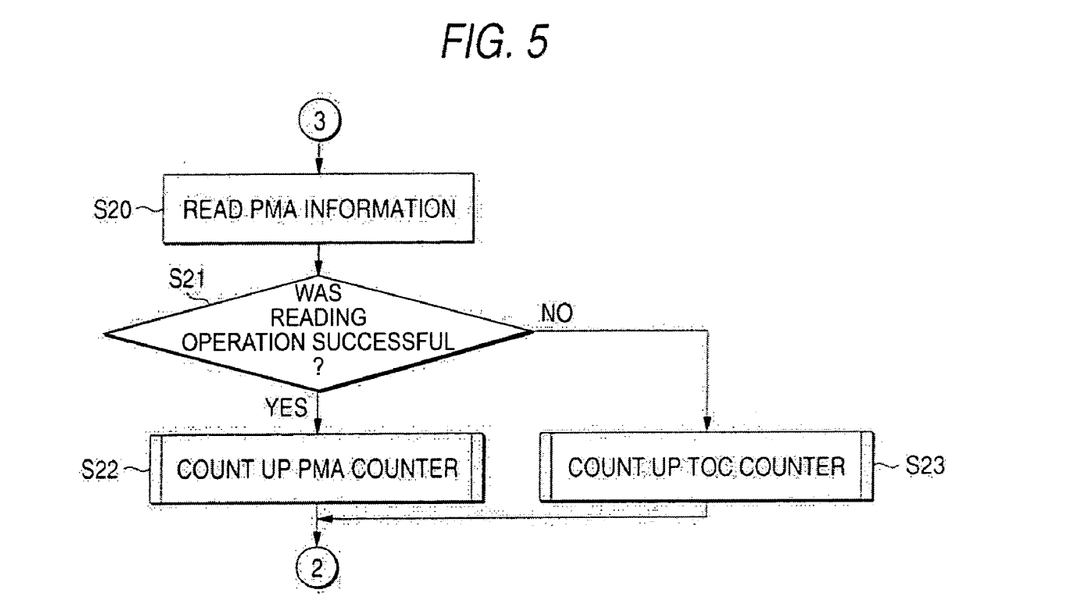
FIG. 5 is a flow chart of a subroutine of a spin-up process of FIG. 2.

The spin-up process carried out in step SA2 will now be described with reference to FIGS. 3–5. In the spin-up process, the CPU 1 first initializes a PMA flag (set in step S8 which will be described later) in a step S1.

The CPU 1 then carries out in the step S2 a process for identifying the type of medium of the disk 7. To be specific, the process in step S2 is carried out in accordance with the existence or nonexistence of ATIP (Absolute Time In Pregroove) on the disk 7. The ATIP represents a groove (called "groove") existing on a CD-R disk and a CD-RW disk. In this groove, time information and disk information, etc. are recorded in an ATIP format by fine wobbles. When ATIP exists on the disk 7, a determination that the disk 7 is a write-once type disk (write enable disk), such as a CD-R disk, a CD-RW disk, etc. is made. When ATIP does not exist, a determination that the disk 7 is a write unable disk is made.

The CPU 1 then determines in step S3 on the basis of the results of step S2 whether the disk 7, a subject to be processed at present is a write enable disk or not. When the disk 7 is a write enable disk, the operation advances to step S4. When the disk 7 is a write unable disk, the operation advances to step S9.

The CPU 1 determines in step S4 whether a value counted by a PMA counter is not smaller than that counted by a TOC counter or not. The PMA counter is a counter adapted to count the number of disks, in which the information is written in a PMA region (or the reading of the information in the PMA region succeeded), among the discs 7 in which the information is theretofore read in the disk drive 13. The TOC counter is adapted to count the number of disks, in which the information is not written in the PMA region (or the reading of the information in the PMA region is not successful), among the discs 7 in which the information is theretofore read in the disk 13. The values from these counters are written in the flash memory 12.

When the value from the PMA counter is not smaller than the value from the TOC counter, the CPU 1 advances the process to step S5. When the value from the TOC counter is larger than that of the PMA counter, the CPU 1 advances the process to step S9.

In step S5, the CPU 1 reads the information stored in the PMA region of the disk 7, and advances the process to step S6.

In step S6, the CPU 1 determines whether the reading of information in step S5 succeeded or not. When a determination is made that the reading of this information was successful, the CPU 1 advances the process to step S7. When a determination is made that reading the same information was not successful, the CPU 1 advances the process to step S9.

The CPU 1 has the PMA counter count up the number of disks in the step S6, thereafter sets the PMA flag in step S8, and advances the process to step S9.

The CPU 1 reads TOC information in a lead-in region of the disk 7 in step S9, and determines in step S10 whether the reading of TOC information in step S9 was successful. When the CPU 1 determines in the step S10 that the reading of TOC information in step S9 was successful, the CPU advances the process to step S15. When the CPU 1 determines that the reading of this information was unsuccessful, the CPU 1 advances the process to step S11.

The CPU 1 determines in step S11 whether the PMA flag is set or off. When the CPU 1 determines that the PM flag is off, the CPU 1 advances the process to step S12. When the CPU 1 determines that the PMA flag is set, the CPU 1 returns to the process.

The CPU 1 determines in step S12 in the same manner as in step S4 whether a value counted by the PMA counter is not smaller than that counted by the TOC counter.

When the value from the PMA counter is not smaller than that from the TOC counter, the process is advanced to step S101, and the CPU 1 determines whether the disk 7 is a write enabled disk. When it is determined that the disk 7 is a write enabled disk, the process is advanced to step S102 to perform a spin-up process NG determination. On the contrary, when it is determined that the disk 7 is a write enabled disk, the process is advanced to step S105 to count up the PMA counter.

Further, when the value from the TOC counter is larger than that of the PMA counter, the process is advanced to step S103 to read the information stored in the PMA region of the disk 7, and the process is advanced to step S104. In step S1104, the CPU 1 determines whether the reading of the information in a step S103 was successful. When the reading of the information is successful, the process is advanced to step S105, and when the reading of the information is not successful, the process is advanced to step S101.

In step S15, the CPU 1 determines on the basis of the results of the step S2 whether the disk 7 constituting a subject to be processed at present is a write enabled disk or not. When the disk 7 is a write enabled disk, the CPU 1 has the TOC counter count up the number of disks, and returns to the process. When the disk 7 is a write enabled disk, the process is advanced to step S17.

The CPU 1 determines in a step S117 whether the PMA flag is set. When the PMA flag is set, the process is retuned to a sequential path. When this flag is off, the process is advanced to step S118.

In step S18, the CPU 1 determines in the same manner as in the steps S4 and S12 whether the value from the PMA counter is not less than that of the TOC counter. When the value from the PMA counter is not less than that of the TOC counter, the CPU 1 has the TOC counter count the number of disks in a step S19, and thereafter the process returns to a sequential path. When the value of the TOC counter is smaller than that of the PMA counter, the process is advanced to step S20.

The CPU 1 reads in step S20 the information stored in the PMA region of the disk 7, and determines in a step S21 whether the reading of the information in the step S20 was successful. When the reading of this information is successful, the CPU 1 has the PMA counter count up the number of disks in a step S22, and returns the process. When the reading of the information did not succeed, the CPU 1 has the TOC counter count up the number of disks in a step S23, and the process is returned to a sequential path.

The contents of processes with respect to four types of write-once type disks into which the disks are classified concerning the existence and non-existence of PMA and TOC regions shown in Table 1 in the above-described spin-up process will now be summarized.

| Type | Existence and non-existence of PMA | Existence and non-existence of TOC | Concrete example |
| --- | --- | --- | --- |
| A | Exists | Exists | Session-closed disk or multi-session disk |
| B | Exists | Does not exist | First session-unclosed disk |
| C | Does not exist | Exists | Disk written by a disk-at-once method |
| D | Does not exist | Does not exist | Blank disk |

As shown in Table 1, the type A disk is a session-closed disk or a multi-session disk, a type B disk a first session-unclosed disk, the type C disk a disk written by a disk-at-once method, and the type D disk a blank disk (disk in which information is not written).

First, a case where the value from the PMA counter is not smaller than that of the TOC counter, i.e. a case where the disks (type A and type B disks) having information stored in the PMA region the number of which is larger than that of the disks (type C and type D disks) not having information stored in the PMA region become subjects to be processed in the disk drive 13 will be discussed.

In this case, the processes in steps S1 to S5 are carried out in order for the types A to D disks.

After the type A disk is subjected to the steps of S6 to S10, the disk is subjected to the step S15 and then step S17 to complete a spin-up process. In the spin-up process for a type A disk, the TOC information stored in the lead-in region is read after the information stored in the PMA region is read as shown in FIG. 7. When a spin-up process for the type A disk finishes, the PMA counter is made to count up the number of disks in the step S7.

The type B disk is subjected to the steps S6 to S10, and then to the step S11 to complete a spin-up process. In the spin-up process for the type B disk, only the information stored in the PMA region is read. When a spin-up process for the type B disk is completed, the PMA counter is made to count up the number of disks in the step S7.

The type C disk is subjected to the steps S6, S9, S10, S15, S17, S18 and S19 in order, to finish a spin-up process. In the spin-up process for a type C disk, only the TOC information stored in the lead-in region is read as shown in FIG. 8. When the spin-up process for the type C disk finishes, the TOC counter is made to count up the number of disks in the step S19.

The type D disk is subjected to the steps S6, S10, S11, S12 and S14 in order, to finish a spin-up process. In the spin-up process for a type D disk, the reading of the information stored in the PMA region and the reading of the TOC information stored in the lead-in region are tested as shown in FIG. 8. When a spin-up process for the type D disk finishes, the TOC counter is made to count up the number of disks in the step S14.

A case where a counted value of the TOC counter is larger than that of the PMA counter, i.e. a case where the type C and type D disks the number of which is larger than that of the type A and type B disks become the subjects to be processed will now be discussed.

In this case, the type A to type D disks are subjected to the processes in the steps S1 to S4 and S9 in order.

The type A disk is subjected to the steps S10, S15, S17, S18 and S20 to S22, to finish a spin-up process. When the spin-up process for the type A disk finishes, the PMA counter is made to count up the number of disks in the step S22.

The type B disk is subjected the steps S10 to S14, to finish a spin-up process. When the spin-up process for the type B disk finishes, the PMA counter is made to count up the number of disks in the step S14.

The type C disk is subjected to the steps S10, S15, S17, S18, S20; S21 and S23 in order, to finish a spin-up process. When the spin-up process for the type C disk finishes, the TOC counter is made to count up the number of disks in the step S23.

The type D disk is subjected to the steps S10 to S14 in order, to finish a spin-up process. When the spin-up process for the type D disk finishes, the TOC counter is made to count up the number of disks in the step S14.

In a spin-up process for a non-write-once disk, the steps S1 to S3 are carried out, and thereafter the steps S9, S10, S15 and S16. The reading of only the TOC information stored in the lead-in region is done, and the TOC counter is made to count up the number of disks.

Figure 6:
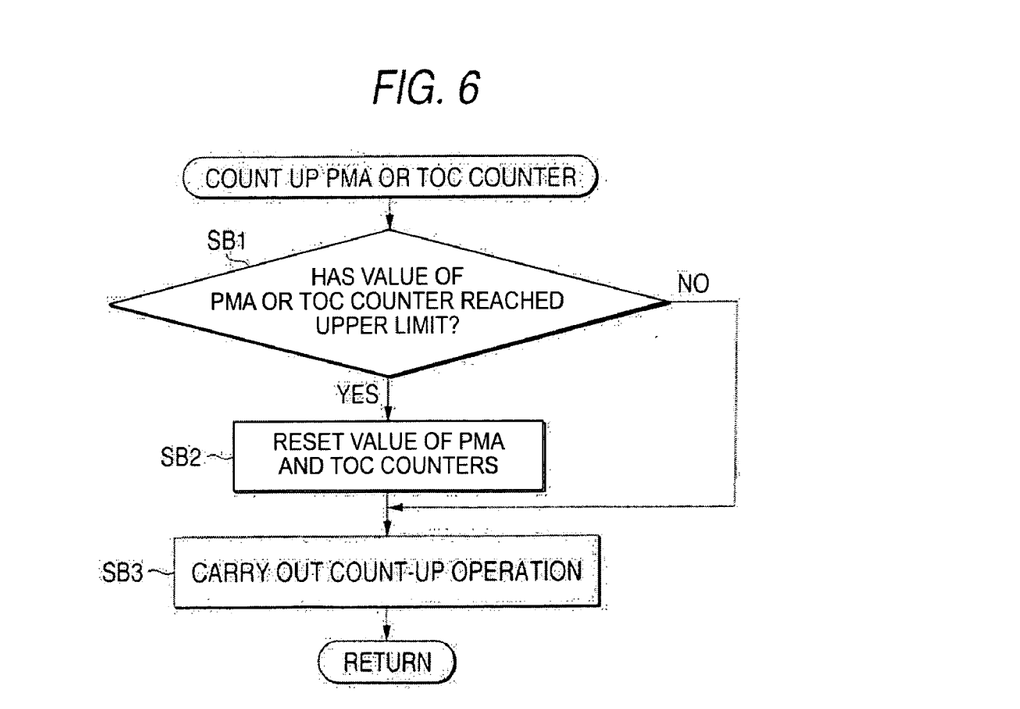
FIG. 6 is a flow chart of a subroutine of PMA/TOC count-up processes of FIGS. 3 to 5.

The details of a disk number counting process of the PMA counter executed in the steps S7, S14 and S22 and a disk number counting process of the TOC counter executed in the steps S16, S19 and S23 will now be described with reference to FIG. 6. These processes for counting the number of disks are carried out in the same mode. FIG. 6 is a flow chart of a subroutine of these disk number counting processes.

In the disk number counting process, the CPU 1 first determines in a step SB1 whether a value counted by either the PMA counter or the TOC counter reaches an upper limit level or not. When the value of either the PMA or TOC counters has not yet reached an upper limit level, the CPU 1 advances the process to step SB3, and when the value of either the PMA or TOC counters reaches the upper limit level, the CPU 1 advances the process to step SB.

In step SB2, the CPU 1 carries out a resetting operation, and advances the process to step SB3. During the resetting operation, the CPU 1 takes a difference between the value of the counter which has reached an upper limit level and that of the other counter, and resets the values of both of the counters. The counter then adds this difference to the counter which had reached an upper limit level.

In step SB3, the CPU 1 counts up the number of disks and returns the process to sequential flow. When the CPU 1 is at this time in a process for counting up on the PMA counter, the CPU 1 counts up on the PMA counter. When the CPU 1 is at this time in a process for counting up on the TOC counter, the CPU 1 counts up on the TOC counter.

It is to be considered that the embodiments disclosed in this specification are examples in all respects, and that these examples are not restrictive. The scope of the present invention is not shown by the above description but by the claims, and the invention is intended to include all modifications within what is meant by and within the scope of the claims.

When according to the present invention described above, many of the write-once disks mounted on the tray in the disc drive are disks in which information is written by a disk-at-once method, the reading of the disk is started from the lead-in area. This enables the time for executing a spin-up process for a write-once disk in which the writing of information is done by a disk-at-once method to be reduced in accordance with a utilization mode of a user of the disk drive. When many write-once disks in which information is not written by a disk-at-once method is used in the disk drive, the reading of the information is done from a program memory area, so that a spin-up process is carried out efficiently. Moreover, even when the number of disks in which information is written in the program memory area or the number of disks in which information is not written in the same area reaches an upper limit of memorization, the upper limit condition can be cancelled with a difference between these numbers retained. Therefore, the inconveniences encountered in a related art disk drive of this kind in which the memorization of information becomes impossible when the number of disks reaches an upper limit of memorization can be avoided.

[FIG. 1]

2: PICKUP DRIVING CIRCUIT

3: LASER CONTROL CIRCUIT

4: ROTATION CONTROL CIRCUIT

8: AUDIO OUTPUT CIRCUIT

9: BUFFER MEMORY

10: INTERFACE CONTROL CIRCUIT

11: DISK INFORMATION STORAGE

12: FLASH MEMORY

14: HOST COMPUTER

[FIG. 2]

A: MAIN ROUTINE

SA1: INSERT A DISK.

SA2: CARRY OUT A SPIN-UP PROCESS.

SA3: ARE INSTRUCTIONS GIVEN?

SA4: IS THE DISK DISCHARGED?

SA5: CARRY OUT A PROCESS IN ACCORDANCE WITH THE INSTRUCTIONS.

SA6: DISCHARGE THE DISK.

[FIG. 3]

A: CARRY OUT A SPIN-UP PROCESS.

S1: INITIALIZE A FLAG

S2: IDENTIFY A MEDIUM.

S3: IS THE DISK A WRITE ENABLED DISK?

S4: IS A VALUE OF A PMA COUNTER NOT SMALLER THAN THAT OF A TOC COUNTER?

S5: READ PMA INFORMATION.

S6: DID THE READING OPERATION SUCCEED?

S7: COUNTING UP THE PMA COUNTER.

S8: SET THE PMA FLAG

S9: READ TOC INFORMATION.

S10: DID THE READING OPERATION SUCCEED?

S11: IS THE PMA FLAG OFF?

S12: IS THE VALUE OF THE PMA COUNTER NOT SMALLER THAN THAT OF THE TOC COUNTER?

S101: IS THE DISK A WRITE ENABLED DISK?

S102: PERFORM A SPIN-UP PROCESSING DETERMINATION

S103: READ PMA INFORMATION.

S104: WAS THE READING OF THE INFORMATION SUCCESSFUL?

S105: COUNT UP THE PMA COUNTER.

[FIG. 4]

A: RETURN.

S15: IS THE DISK A WRITE ENABLED DISK?

S16: COUNT UP THE TOC COUNTER.

S17: IS THE PMA FLAG SET?

S18: IS THE VALUE OF THE PMA COUNTER NOT SMALLER THAN THAT OF THE TOC COUNTER?

S19: COUNT UP THE TOC COUNTER.

[FIG. 5]

S20: READ PMA INFORMATION.

S21: DID THE READING OPERATION SUCCEED?

S22: COUNT UP THE PMA COUNTER.

S23: COUNT UP THE TOC COUNTER.

[FIG. 6]

A: COUNT UP THE PMA OR TOC COUNTER.

SB1: HAS THE VALUE OF THE PMA OR TOC COUNTER REACHED THE UPPER LIMIT?

SB2: RESET THE VALUE OF THE PMA AND TOC COUNTERS.

SB3: CARRY OUT A COUNT-UP OPERATION.

B: RETURN.

[FIG. 7]

A: PMA REGION

B: LEAD-IN REGION (TOC)

C: DATA REGION

D: INNER SIDE

E: OUTER SIDE

[FIG. 8]

A: PMA REGION

B: LEAD-IN REGION (TOC)

C: DATA REGION

[FIG. 9]

A: SINCE THE INFORMATION CANNOT BE READ, A READ ERROR IS RECORDED.

B: ADVANCE THE PROCESS TO THE LEAD-IN REGION.

C: PMA REGION

F: LEAD-IN REGION (TOC)

E: DATA REGION

[FIG. 10]

A: PMA REGION

B: LEAD-IN REGION (TOC)

C: DATA REGION

The invention claimed is:

1. A disk drive comprising:
a tray on which a disk is mounted,
a pickup adapted to read information stored in the disk mounted on said tray,
a pickup controller adapted to control an information reading mode of said pickup, and
a disk type determination element adapted to determine whether the disk mounted on said tray is a write-once type disk, wherein
said pickup controller includes:
a counter adapted to store therein a first number representing the number of disks, in which information is written in program memory areas thereof, among write-once type disks which are mounted on said tray, and a second number representing the number of disks, in which information is not written in program memory areas thereof, among the same write-once type disks,
said pickup controller being adapted to have the pickup start reading information from the program memory areas of the disks during a disk spin-up operation when the first number is larger than the second number, and have the pickup start reading information from lead-in areas of the disks during the spin-up operation when the second number is larger than the first number,
said counter having an upper limit to storable first or second numbers, said counter being adapted to compute a difference between the first and second numbers when either one of the first number and second number reaches the upper limit, reset the first and second numbers, and store the difference as one of the two numbers.

2. A disk drive comprising:
a tray on which a disk is mounted,
a pickup adapted to read information stored in the disk mounted on said tray,
a pickup controller adapted to control an information reading mode of said pickup, and
a disk type determination element adapted to determine whether the disk mounted on said tray is a write-once type disk or not, wherein
said pickup controller includes:
a counter adapted to store therein a first number representing the number of disks, in which information is written in program memory areas thereof, among write-once type disks which is mounted on the tray, and a second number representing the number of disks, in which information is not written in program memory areas thereof, among the same additional write-once type disks,
said pickup controller being adapted to have the pickup start reading information from the program memory areas of the disks during a disk spin-up operation when the first number is larger than the second number, and have the pickup start reading information from lead-in areas of the disks during the spin-up operation when the second number is larger than the first number.

3. A method for reducing spin-up processing time comprising the steps of:
storing a first number representing the number of disks, in which information is written in program memory areas thereof, among write-once type disks which are mounted on a tray, and a second number representing the number of disks, in which information is not written in program memory areas thereof, among the same write-once type disks, in a counter;
comparing the first number and the second number during a disk spin-up operation,
starting a pickup to read information from the program memory areas of the disks when the first number is larger than the second number, and
starting a pickup to read information from lead-in areas of the disks when the second number is larger than the first number,
determining if either one of the first number and the second number reaches an upper limit of said counter,
computing a difference between the first and second numbers,
resetting the first and second numbers, and
storing the difference as one of the two numbers.

4. A method for reducing spin-up processing time comprising the steps of:
storing a first number representing the number of disks, in which information is written in program memory areas thereof, among write-once type disks which is mounted on a tray, and a second number representing the number of disks, in which information is not written in program memory areas thereof, among the same write-once type disks;
comparing the first number and the second number during a disk spin-up operation,
starting a pickup to read information from the program memory areas of the disks when the first number is larger than the second number, and
starting a pickup to read information from lead-in areas of the disks when the second number is larger than the first number.

* * * * *